United States Patent
Herbert et al.

(10) Patent No.: US 6,948,697 B2
(45) Date of Patent: Sep. 27, 2005

(54) APPARATUS AND METHOD FOR CONTROLLING FLUID FLOW

(75) Inventors: Kay Herbert, Winthrop, MA (US); Natan E. Parsons, Brookline, MA (US); Xiaoxiong Mo, Lexington, MA (US)

(73) Assignee: Arichell Technologies, Inc., West Newton, MA (US)

( * ) Notice: Subject to any disclaimer, the term of this patent is extended or adjusted under 35 U.S.C. 154(b) by 0 days.

(21) Appl. No.: 10/421,359

(22) Filed: Apr. 23, 2003

(65) Prior Publication Data

US 2004/0046137 A1 Mar. 11, 2004

Related U.S. Application Data

(63) Continuation of application No. PCT/US01/51098, filed on Oct. 25, 2001, which is a continuation-in-part of application No. 09/696,154, filed on Oct. 25, 2000, now Pat. No. 6,609,698, said application No. PCT/US01/51098, is a continuation of application No. 09/924,130, filed on Aug. 7, 2001, now Pat. No. 6,450,478, said application No. PCT/US01/51098, is a continuation-in-part of application No. 10/037,473, filed on Oct. 19, 2001, now abandoned, which is a continuation of application No. 09/514,491, filed on Feb. 29, 2000, now Pat. No. 6,305,662.

(51) Int. Cl.[7] ............................................... F16K 31/02
(52) U.S. Cl. ............................ 251/129.04; 251/129.07; 251/129.17
(58) Field of Search ....................... 251/129.17, 129.07, 251/282, 129.04; 277/926; 335/257, 269, 277

(56) References Cited

U.S. PATENT DOCUMENTS

| | | | |
|---|---|---|---|
| 2,413,622 A | 12/1946 | Harding, Jr. ................. | 251/70 |
| 2,619,986 A | 12/1952 | Goepfrich ................... | 137/719 |
| 2,842,400 A | 8/1958 | Booth et al. ................ | 299/149 |
| 3,098,635 A * | 7/1963 | Delaporte et al. ..... | 251/129.17 |
| 3,369,205 A | 2/1968 | Hamrick ..................... | 335/177 |
| 3,606,241 A * | 9/1971 | Bornholdt .............. | 251/129.17 |

(Continued)

FOREIGN PATENT DOCUMENTS

| | | | |
|---|---|---|---|
| EP | 0 072 681 | 2/1983 | |
| EP | 0 319 618 | 6/1989 | |
| EP | 0 230 150 | 10/1990 | |
| EP | 0 663 552 | 7/1995 | |
| EP | 0 942 214 | 9/1999 | |
| FR | 2 590 088 | 5/1987 | |
| JP | 07-332534 | 12/1995 | .......... F16K/31/42 |
| JP | 2000-266196 | 9/2000 | ............. F16K/7/17 |
| JP | 2000-283322 | 10/2000 | .......... F16K/31/06 |
| JP | 2001-050419 | 2/2001 | .......... F16K/31/06 |
| WO | WO 85/05657 | 12/1985 | |
| WO | WO 88/01705 | 5/1988 | |

OTHER PUBLICATIONS

Information Disclosure Statement issued in PCT Application PCT/US01/51098 on Aug. 13, 2002.

*Primary Examiner*—Eric Keasel
(74) *Attorney, Agent, or Firm*—Ivan D. Zitkovsky

(57) ABSTRACT

An actuator base, bobbin, and pole piece form a pocket for an armature that a flexible membrane encloses to form an armature chamber filled with an incompressible fluid. The membrane protects the armature from exposure to corrosive fluids flowing in a conduit. Conduit flow can be stopped by driving the membrane against a valve seat. Pressure from the controlled fluid in the conduit is transmitted through the membrane to the fluid within the armature chamber so that the armature does not need to counteract force applied to the membrane by the conduit fluid's pressure.

32 Claims, 5 Drawing Sheets

U.S. PATENT DOCUMENTS

| | | | | |
|---|---|---|---|---|
| 3,740,019 A | * | 6/1973 | Kessell et al. | 251/129.17 |
| 3,802,462 A | | 4/1974 | Trosch | 137/556 |
| 3,812,398 A | | 5/1974 | Kozel et al. | 251/331 |
| 3,821,967 A | | 7/1974 | Sturman et al. | 137/624.15 |
| 4,010,769 A | | 3/1977 | De Lorenzo et al. | 137/312 |
| 4,097,786 A | | 6/1978 | Lund | 318/282 |
| 4,280,680 A | | 7/1981 | Payne | 251/175 |
| 4,304,391 A | | 12/1981 | Yamaguchi | 251/129 |
| 4,383,234 A | | 5/1983 | Yatsushiro et al. | 335/253 |
| 4,505,451 A | | 3/1985 | Jonas | 251/285 |
| 4,597,895 A | | 7/1986 | Bartlett | 252/392 |
| 4,609,178 A | | 9/1986 | Baumann | 251/229 |
| 4,742,583 A | | 5/1988 | Yoshida et al. | 4/313 |
| 4,746,093 A | | 5/1988 | Scanderbeg | 251/30.04 |
| 4,823,825 A | | 4/1989 | Buchi | 361/152 |
| 4,826,132 A | | 5/1989 | Moldenhauer | 251/129.17 |
| 4,832,582 A | * | 5/1989 | Buffet | 417/413.1 |
| 4,887,032 A | | 12/1989 | Hetrick | 324/296.16 |
| 4,894,698 A | | 1/1990 | Hijikigawa et al. | 257/254 |
| 4,910,487 A | | 3/1990 | Kleinhappl | 335/234 |
| 4,921,208 A | * | 5/1990 | LaMarca | 251/30.04 |
| 4,932,430 A | | 6/1990 | Fernstrom | 137/85 |
| 4,944,487 A | | 7/1990 | Holtermann | 251/129.17 |
| 4,977,929 A | | 12/1990 | Chinnock et al. | 137/863 |
| 4,981,155 A | | 1/1991 | Pick et al. | 137/238 |
| 4,988,074 A | | 1/1991 | Najmolhoda | 251/129.08 |
| 5,032,812 A | | 7/1991 | Banick et al. | 335/17 |
| 5,109,885 A | | 5/1992 | Tauscher | 137/554 |
| 5,127,625 A | | 7/1992 | Kleinhappl | 251/129.17 |
| 5,169,118 A | | 12/1992 | Whiteside | 251/30.03 |
| 5,188,337 A | * | 2/1993 | Mertens et al. | 251/129.17 |
| 5,213,303 A | | 5/1993 | Walker | 251/30.02 |
| 5,265,594 A | | 11/1993 | Olsson et al. | 138/204.18 |
| 5,265,843 A | * | 11/1993 | Kleinhappl | 251/129.17 |
| 5,375,811 A | | 12/1994 | Reinicke | 251/126.16 |
| 5,408,369 A | | 4/1995 | Miura et al. | 360/75 |
| 5,433,245 A | | 7/1995 | Prather et al. | 137/554 |
| 5,443,241 A | | 8/1995 | Odaira et al. | 251/129.07 |
| 5,474,303 A | | 12/1995 | Coles | 277/2 |
| 5,481,187 A | | 1/1996 | Marcott et al. | 324/207.16 |
| 5,574,617 A | | 11/1996 | Shimanuki et al. | 361/154 |
| 5,583,434 A | | 12/1996 | Moyers et al. | 324/207.16 |
| 5,584,465 A | | 12/1996 | Ochsenreiter | 251/65 |
| 5,600,237 A | | 2/1997 | Nippert | 324/207.16 |
| 5,603,483 A | | 2/1997 | Reuter et al. | 251/129.02 |
| 5,607,137 A | | 3/1997 | Kanda et al. | 251/129.07 |
| 5,636,601 A | | 6/1997 | Moriya et al. | 123/90.11 |
| 5,708,355 A | | 1/1998 | Schrey | 323/282 |
| 5,716,038 A | | 2/1998 | Scarffe | 251/30.03 |
| 5,747,684 A | | 5/1998 | Pace et al. | 73/119 A |
| 5,785,955 A | | 7/1998 | Fischer | 424/49 |
| 5,787,915 A | | 8/1998 | Byers et al. | 137/1 |
| 5,787,924 A | | 8/1998 | Cewers et al. | 251/129.04 |
| 5,797,360 A | | 8/1998 | Pischinger et al. | 123/90.11 |
| 5,804,962 A | | 9/1998 | Kather et al. | 324/207.16 |
| 5,815,362 A | | 9/1998 | Kahr et al. | 361/154 |
| 5,900,201 A | | 5/1999 | Chatterjee et al. | 264/109 |
| 5,905,625 A | | 5/1999 | Schebitz | 361/154 |
| 5,941,505 A | | 8/1999 | Nagel | 251/335.2 |
| 5,964,192 A | | 10/1999 | Ishii | 123/90.11 |
| 6,036,167 A | | 3/2000 | Wade | 251/30.04 |
| 6,044,814 A | | 4/2000 | Fuwa | 123/90.11 |
| 6,076,550 A | | 6/2000 | Hiraishi et al. | 137/550 |
| 6,155,231 A | | 12/2000 | Adachi et al. | 123/399 |
| 6,158,715 A | | 12/2000 | Kirschbaum | 251/129.06 |
| 6,178,956 B1 | | 1/2001 | Steinmann et al. | 123/568.21 |
| 6,609,698 B1 | * | 8/2003 | Parsons et al. | 251/129.17 |

* cited by examiner

APPARATUS AND METHOD FOR CONTROLLING FLUID FLOW

This application is a continuation of PCT Application PCT/US01/51098 filed on Oct. 25, 2001, which is a continuation-in part of U.S. application Ser. No. 09/696,154 filed on Oct. 25, 2000 now U.S. Pat. No. 6,609,698, entitled "Ferromagnetic/Fluid Valve Actuator." The PCT Application PCT/US01/51098 is also a continuation-in part of U.S. application Ser. No. 09/924,130, filed on Aug. 7, 2001 now U.S. Pat. No. 6,450,478, entitled "Reduced-Energy Consumption Actuator." The PCT Application PCT/US01/51098 is also a continuation-in part of U.S. application Ser. No. 10/037,473, filed on Oct. 19, 2001 now abandoned, which in turn is a continuation of U.S. application Ser. No. 09/514,491, filed on Feb. 29, 2000, now U.S. Pat. No. 6,305,662, entitled "Reduced-Energy Consumption Actuator." The above-cited applications are incorporated by reference for all purposes.

BACKGROUND OF THE INVENTION

1. Field of the Invention

The present invention relates to controlling fluid flow in various systems.

2. Background Information

Industrial, agricultural and household systems use various types of valves for controlling fluid flow. The most common form of electrically operated valve employs a solenoid wound onto a bobbin, and a valve member located inside the bobbin and driven by a drive current passed through the solenoid. In a closed position, a tip of the valve member is pressed against a valve seat and thereby stop flow through a conduit in which the valve seat is disposed. Although the tip of the valve member is in many cases made of a synthetic resin or other resilient material, other parts of the valve member are made up of a material having relatively high-magnetic-permeability, such as steel, so that it will be subject to force from the solenoid's magnetic field and will act as a solenoid armature.

In battery-operated actuators, electric-valve-control circuitry should employ as little power as possible. To achieve highly energy efficient operation, the valve member (i.e., the solenoid's armature) needs to be as magnetically permeable as much as possible. Furthermore, the electric-valve-control circuitry should apply only the minimum drive current necessary and for the minimum duration during the armature activation, in latching valves (i.e., valves whose actuators require power to open or close the valve but not to keep it opened or closed). In non-latching actuators, unnecessarily high drive current for holding the valve open also may unnecessarily reduce the battery's longevity. Therefore, the reduction of energy consumption is an important aspect of an actuator design.

In many prior art actuators, water (or other fluid being regulated) can flow into the bobbin's cavity that contains the actuator. The actuator frequently includes a flow passage in communication with an internal void to provide a low-flow-resistance path and to compensate the external pressure onto the valve member (i.e., the pressure exerted by the regulated fluid onto the armature). Thus, the regulated fluid moves back and forth in response to closing or opening the actuator. This usually causes degradation of the armature (i.e., corrosion) and problems with metal and other ions (or other deposits) that accumulate within the bobbins cavity. The severity of this problem depends on the type of fluid, e.g., type of water, being regulated.

As mentioned above, an optimal armature of the solenoid has as high magnetic permeability as possible. However, materials with very high magnetic permeability have usually low corrosion resistance. Thus, designers in the past have had to compromise permeability for corrosion resistance. For example, carbon steel has a high magnetic permeability, but is quite vulnerable to rust and corrosion. Therefore, designers have resorted to the higher-magnetic-permeability grades of stainless steel, even though stainless steel is less magnetically permeable than carbon steel. Still, the designers have had problems with the above-described deposits, or conversely problems with preventing fluid contamination by the armature, bobbin or other valve elements.

Therefore, there is still a need for an improved valve actuator.

SUMMARY OF THE INVENTION

The present invention relates to an apparatus and method for controlling fluid flow in various systems.

According to one aspect, an electromagnetic actuator includes a solenoid coil and an armature housing constructed and arranged to form an armature pocket arranged to receive a ferromagnetic armature including a distal part. The actuator also includes a membrane secured with respect to the pocket and arranged to enclose at least partially the distal tip to seal armature fluid within the pocket, wherein displacement of the distal part of the armature displaces the membrane with respect to a valve passage controlled by the actuator.

According to another aspect, an electromagnetic actuator that includes a solenoid coil and an armature housing that forms an armature pocket within which a ferromagnetic armature is disposed. The actuator is operable by driving electric current through the solenoid coil to drive the armature between retracted and extended armature positions. The actuator includes a flexible membrane so secured at a mouth of the pocket as to deform outward when the armature travels to its extended armature position and as further to form with the armature housing a substantially fluid-tight armature chamber that includes the armature. A substantially incompressible fluid occupies substantially the entire chamber volume not occupied by the armature.

According to yet another aspect, a valve includes a conduit forming a fluid-flow channel providing a valve seat, and an electromagnetic actuator. The electromagnetic actuator includes a solenoid coil and an armature housing that forms an armature pocket within which a ferromagnetic armature is disposed. The actuator is operable by driving electric current through the solenoid coil to drive the armature between retracted and extended armature positions. The actuator also includes a flexible membrane so secured at a mouth of the pocket as to deform and so seal against the valve seat as to prevent fluid flow through the fluid-flow channel when the armature travels to its extended armature position, wherein the membrane and the armature housing form a substantially fluid-tight armature chamber that contains the armature. A substantially incompressible fluid occupies substantially the entire chamber volume not occupied by the armature.

Preferred embodiments of these aspects include one or more of the following features. The actuator may include a permanent magnet arranged to form a latching actuator. The actuator may include a bias spring positioned and arranged to bias said armature toward its extended position. The distal part of the armature (i.e. armature tip) may be arranged to compress the membrane against a valve seat when the armature is disposed in its extended armature position. A ratio that the area of the distal part bears to the area of the membrane exposed to a conduit upstream of the membrane is between 1.4 and 12.3.

The armature fluid may include incompressible fluid comprising a corrosion inhibitor. The incompressible fluid may consist essentially of water mixed with a corrosion inhibitor.

According to yet another aspect, an actuator system includes an actuator including an armature and a coil operable by application of a coil drive and thereby displace the armature, and a membrane partially enclosing the armature. The actuator system also includes an armature sensor constructed to detect displacement of the armature; and a control circuit operable to begin applying coil drive to the coil in response to an output from the armature sensor.

According to yet another aspect, an actuator system includes an actuator including an armature, a membrane, and a coil operable by application of a coil drive thereto in a first drive direction to conduct current in a first current direction and thereby tend to drive the armature to a first end position; a sound sensor so coupled to the actuator as to sense sound made by the armature in reaching the first end position, the sound sensor generating a sensor output indicative of the sound that it senses. The system also includes a control circuit operable to begin applying coil drive to the coil in the first drive direction and responsive to the sensor output's meeting a predetermined first current-termination criterion to stop applying coil drive to the coil in the first drive direction.

Preferably, in this embodiment, the coil is operable by application of a coil drive thereto in a second drive direction to conduct current in a second current direction and thereby tend to drive the armature to a second end position; the sensor is so coupled to the actuator as to sense the armature reaching the second end position; and the control circuit is operable to begin applying coil drive to the coil in the second drive direction and responsive to the sensor output meeting a predetermined second current-termination criterion to stop applying coil drive to the coil in the second drive direction.

The actuator may include the above first and second current-termination criteria that differ.

The present design reduces the energy waste that usually occurs in driving the actuator's armature. An armature sensor monitors the armature movement or determines when the armature has reached the end of its travel. At a selected point, based on a signal from the armature sensor, a drive signal to the actuator-coil drive ends. This can reduce energy consumption greatly, because coil-drive duration thereby does not always need to be long enough to meet worst-case requirements usually applied when there is no armature sensor. This can result in a significant battery-longevity increase.

According to another aspect, the valve actuator can use materials with a high magnetic permeability such as the ferromagnetic types of stainless steel regardless of their low corrosion-resistivity and the armature does not need to be subjected to a number of treatment steps to afford an acceptable level of corrosion resistance. Thus, the present design reduces valve cost, or reduces the greater solenoid-wire size required because the armature's permeability is not as great as optimally possible.

In one preferred embodiment, we secure a flexible membrane over the end of the pocket in which the armature travels as to protect the armature's high-permeability material from exposure to the possibly corrosive fluid whose flow the valve is to control. Furthermore, we fill the armature pocket with an incompressible fluid so as to counterbalance the force exerted by the controlled fluid's pressure. We improve various prior art designs, for example by eliminating various problems such as that of U.S. Pat. No. 5,941,505 to Nagel to prevent leaks in membranes that protect the controlled fluids from valve-assembly contaminants.

DETAILED DESCRIPTION OF AN ILLUSTRATIVE EMBODIMENT

Figure 1:
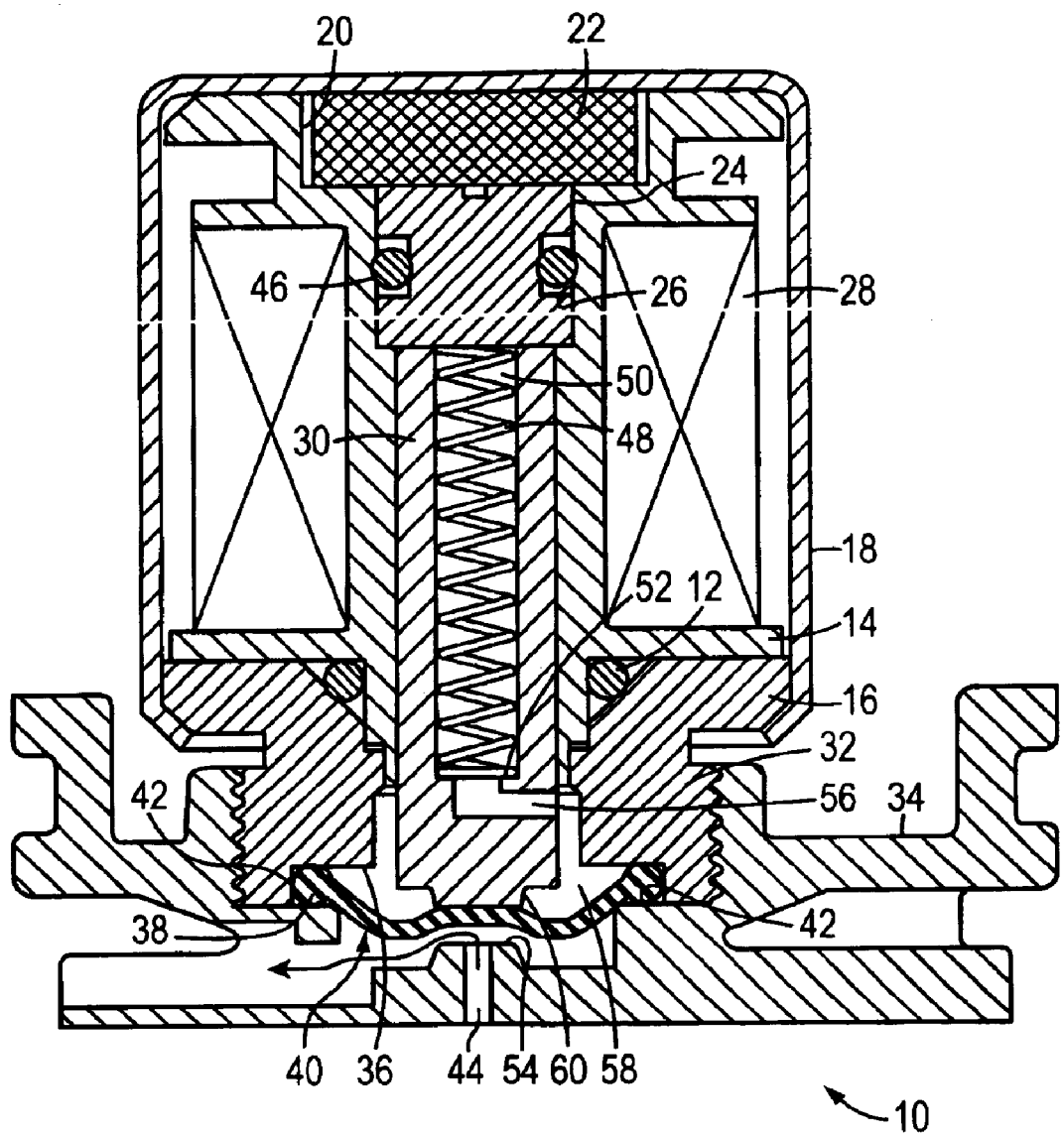
FIG. 1 is a cross-sectional view of an electrically operated valve actuator.

Referring to FIG. 1, industrial, agricultural and household systems use various types of valves for controlling fluid flow. An electrically operable valve 10 uses a solenoid to drive a plunger into a valve seat and thereby stop flow through a conduit in which the valve seat is disposed. Specifically, valve actuator 10 includes an actuator base 16, a ferromagnetic pole piece 24, a ferromagnetic armature 30, slideably mounted in an armature pocket formed in pole piece 24, and a solenoid windings 28 wound about a solenoid bobbin 14. Valve 10 also includes a resiliently deformable O-ring 12 that forms a seal between solenoid bobbin 14 and actuator base 16, all of which are held together by a housing 18. At its upper end, bobbin 14 forms a magnet recess 20 formed for a disk-shaped magnet 22. Solenoid housing 18 (i.e., can 18) is crimped at actuator base 16 to hold magnet 22 and pole piece 24 against bobbin 14 and thereby secure windings 28 and actuator base 16 within can 18.

Valve actuator 10 may be constructed either as latching (shown in FIG. 1) or non-latching. The latching embodiment includes magnet 22 providing magnetic field having orientation and force sufficient to overcome the force of a coil spring 48 and thereby retain armature 30 in the open state even after there is no drive current flowing in the solenoid's windings 28. In the non-latching embodiment, there is no permanent magnet (i.e., magnet 22). To keep armature 30 in the open state, a drive current must continue to flow in windings 28 to provide the necessary magnetic field. Armature 30 moves to the closed state under the force of spring 48 if there is no drive current. On the other hand, in the latching embodiment, a drive current is applied to windings 28 in opposite directions to move armature 30 between the open and closed states, but no drive current is necessary to maintain either state.

Referring still to FIG. 1, actuator base 16 includes a wide base portion substantially located inside can 18 and a narrowed base extension 32. The valve actuator also includes a resiliently deformable membrane 40 having a shoulder 42. The outer surface of base extension 32 threadedly engages complementary threads provided by a recess that a mounting block 34's upper surface forms. An annular surface 36 formed by a counterbore in the base extension 32's lower face squeezes a thickened peripheral rim 38 of resiliently deformable membrane 40 against shoulder 42 formed in the mounting block 34's upper recess. This creates a fluid-tight seal so that the membrane protects the armature 30 from exposure to fluid flowing in mounting block 34's interior fluid conduit 44. It also cooperates with an O-ring seal 46 to form a fluid-tight armature chamber filled with an armature fluid (i.e., liquid or gas) that preferably is relatively inviscid, non-compressible and non-corrosive.

For example, the armature liquid may be water mixed with a corrosion inhibitor, e.g., a 20% mixture of polypropylene glycol and potassium phosphate. Alternatively, the armature fluid may include silicon-based fluid, polypropylene polyethylene glycol or another fluid having a large molecule. The armature liquid may in general be any substantially non-compressible liquid having low viscosity and non-corrosive properties with respect to the armature. Because of this protection, the illustrated embodiment's armature material can be a low-carbon steel; corrosion resistance is not as big a factor as it would otherwise be. Other embodiments may employ armature materials such as the 420 or 430 series stainless steels. It is only necessary that the armature consist essentially of a ferromagnetic material, i.e., a material that the solenoid and magnet can attract. Even so, it may include parts, such as, say, a flexible tip, that are not ferromagnetic.

In operation, coil spring 48 disposed in the armature 30's central cavity 50 bears against a cavity shoulder 52 and thereby tends to urge armature 30 to an extended position from the retracted position shown in FIG. 1. In the non-latching embodiment, armature 30 tends to seek the extended position in the absence of a solenoid current. In the latching embodiment shown in FIG. 1, armature 30 is held in the retracted position by magnet 22 in the absence of a solenoid current. To drive the armature to the extended position therefore requires armature current of such a direction and magnitude that the resultant magnetic force counteracts that of the magnet by enough to allow the spring force to prevail. When it does so, the spring force moves the armature 30 to its extended position, in which it causes the membrane 40's exterior surface to seal against a valve seat 54 that the mounting block 34 forms in the conduit 44. This stops flow in the conduit 44. In this position, the armature is spaced enough from the magnet that the spring force can keep the armature extended without the solenoid's help.

Resilient membrane 40 encloses armature fluid located in a fluid-tight armature chamber in communication with an armature port 56 formed by the armature body. Furthermore, resilient membrane 40 is exposed to the pressure of regulated fluid in conduit 44 and may therefore be subject to considerable external force. However, armature 30 and spring 48 do not have to overcome this force, because the conduit's pressure is transmitted through membrane 40 to the incompressible armature fluid within the armature chamber. The force that results from the pressure within the chamber therefore approximately balances the force that the conduit pressure exerts.

Referring still to FIG. 1, armature 30 is free to move with respect to fluid pressures within the chamber between the retracted and extended positions. Armature port 56 enables the force-balancing fluid displaced from the armature chamber's lower well 58 through the spring cavity 50 to the part of the armature chamber from which the armature's upper end (i.e. distal end) has been withdrawn upon actuation. Although armature fluid can also flow around the armature's sides, arrangements in which rapid armature motion is required should have a relatively low-flow-resistance path such as the one that port 56 helps form. Similar considerations favor use of an armature-chamber liquid that is relatively inviscid.

To return the armature to the illustrated, retracted position and thereby permit fluid flow, current is driven through the solenoid in the direction that causes the resultant magnetic field to reinforce that of the magnet. As was explained above, the force that the magnet 22 exerts on the armature in the retracted position is great enough to keep it there against the spring force. But the armature in a monostable version, which employs no such magnet, would remain in the retracted position only so long as the solenoid conducts enough current for the resultant magnetic force to exceed the spring force.

In short, membrane 40 protects armature 30 and creates a cavity that is filled with a sufficiently non-corrosive liquid, which in turn enables actuator designers to make more favorable choices between materials with high corrosion resistance and high magnetic permeability. Furthermore, membrane 40 provides a barrier to metal ions and other debris that would tend to migrate into the cavity.

In the illustrated embodiment the armature 30's lower end forms a narrowed tip portion 60 (i.e., plunger) having a surface that is touching membrane 40, which in turn comes in contact with seat 54. The plunger surface is related to the seat opening area, both of which can be increased or decreased. The plunger surface and the seat 54's surface can be optimized for a pressure range at which the valve actuator is designed to operate. Reducing the plunger surface (i.e., narrowing tip portion 60) reduces the plunger area involved in squeezing membrane 40 against seat 54, and this in turn reduces the spring force required for a given upstream fluid-conduit pressure. On the other hand, making the plunger tip area too small tends to damage membrane 40 during valve closing over time. We have found that an optimum range of tip-contact area to seat-opening area is between 1.4 and 12.3. The present actuator is suitable for variety of pressures of the controlled fluid. including pressures about 150 psi. Without any substantial modification, the valve actuator may be used in the range of about 30 psi to 80 psi, or even water pressures of about 125 psi.

Figure 2:
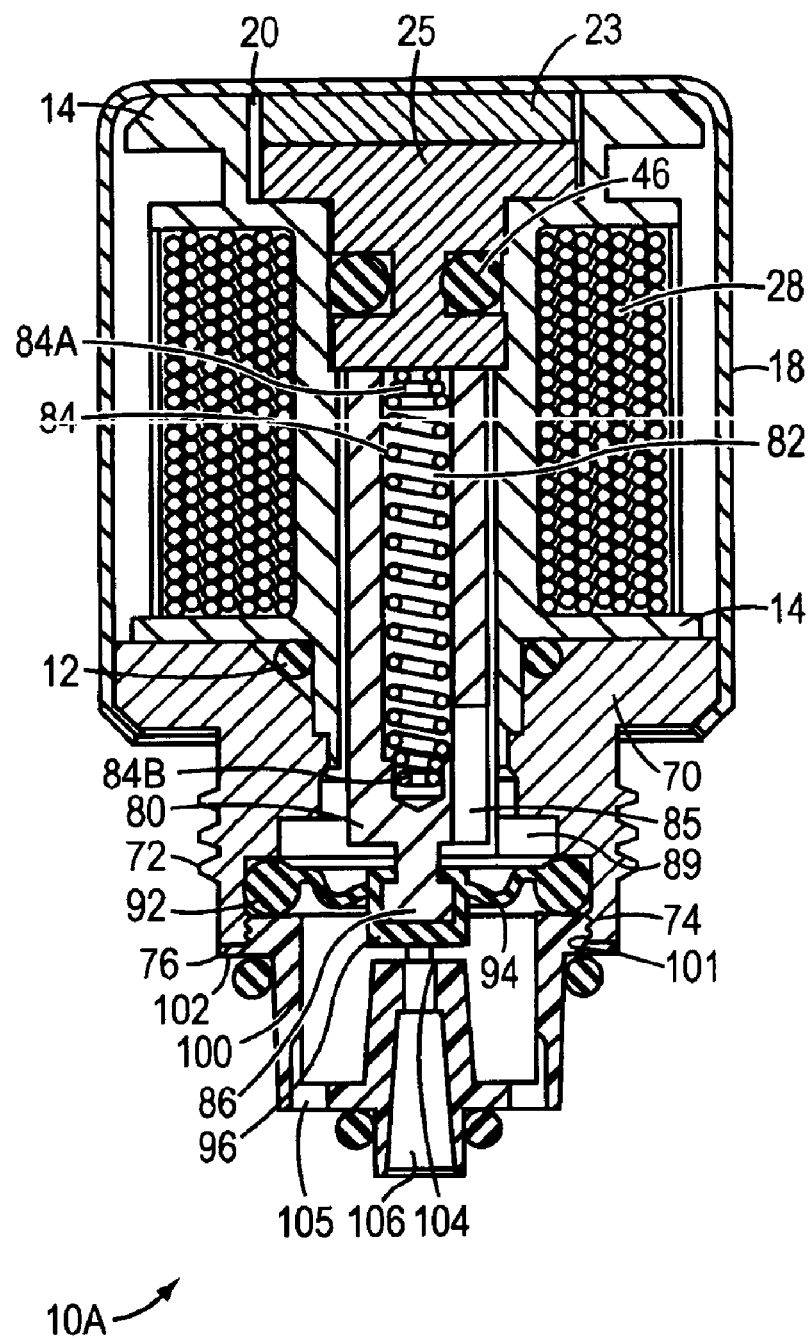
FIG. 2 is a cross-sectional view of another embodiment of an electrically operated valve actuator.
Figure 2A:
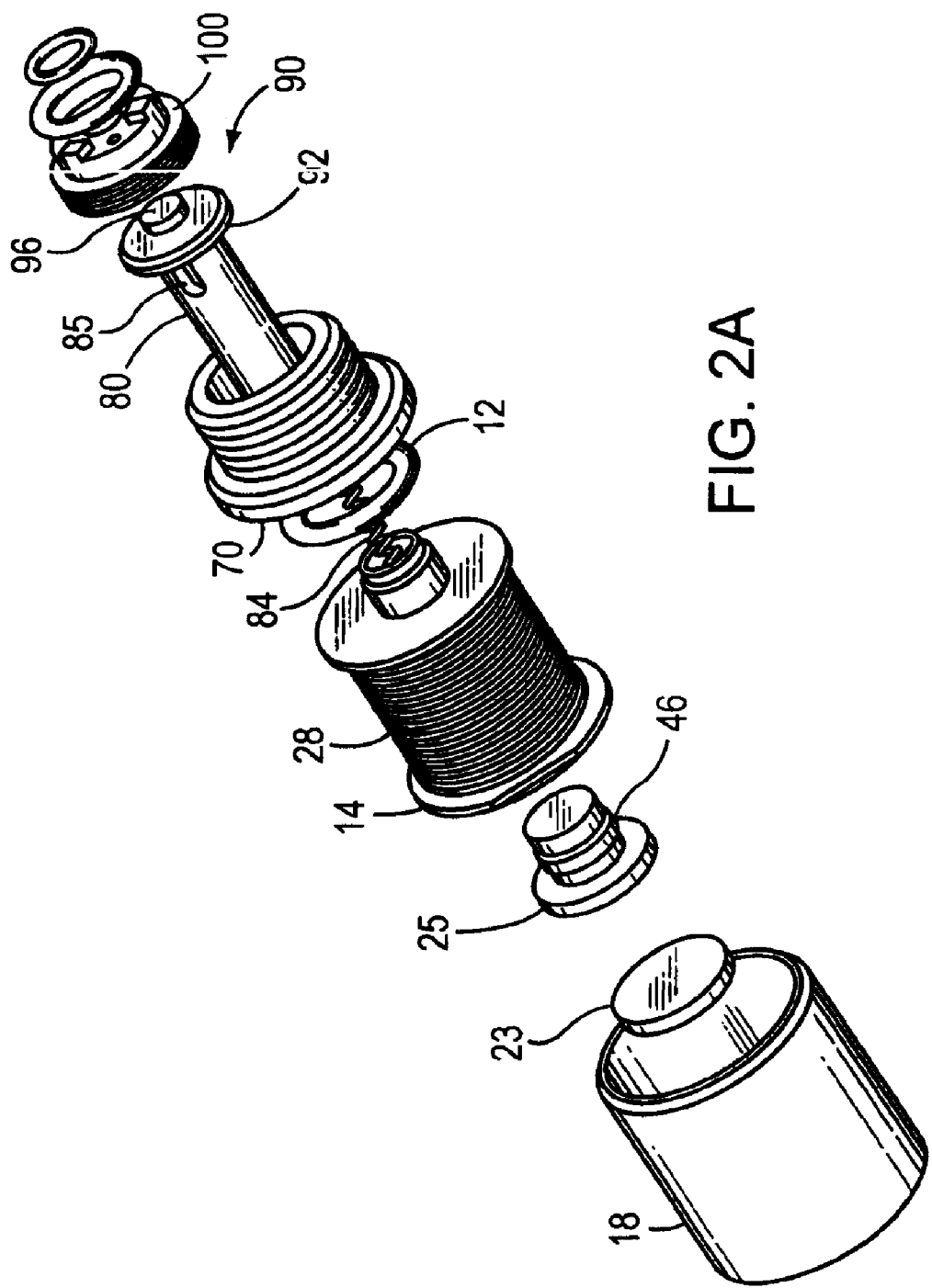
FIG. 2A is an exploded view of the operator shown in FIG. 2.

FIGS. 2 and 2A illustrate another embodiment of an electrically operable valve. Valve actuator 10A includes a magnet 23, a ferromagnetic pole piece 25, a ferromagnetic armature 80, slideably mounted in an armature pocket formed in pole piece 25, and an actuator base 70. Valve 10A also includes solenoid windings 28 wound about solenoid bobbin 14, resilient membrane 90 and a pilot body member 100. Resiliently deformable O-ring 12 forms a seal between solenoid bobbin 14 and actuator base 70, all of which are held together by actuator housing 18. Bobbin 14 forms recess 20 formed for a distal end of pole piece 25 and disk-shaped magnet 23. Housing 18 is crimped at actuator base 70 to hold magnet 23 and pole piece 25 against bobbin 14 and thereby secure windings 28 and actuator base 70 together. Similarly as valve actuator 10, valve actuator 10A may be constructed either as latching (shown in FIG. 2) or non-latching.

Referring still to FIGS. 2 and 2A, actuator base 70 includes a wide base body in contact with bobbing 14, crimped inside can 18, and a narrowed base extension. The narrowed base extension of actuator base 70 includes external threads 72 and internal threads 74. Internal threads 74 are made to fit complemental external threads 101 of a pilot body member 100 to engage a resiliently deformable membrane 90.

Resiliently deformable membrane 90 includes an outer ring 92, compliant region 94, and a resilient, C-shaped region 96. Membrane 90 may be an EDPM diaphragm or another type of diaphragm. In general, deformable membrane 90 and region 96 may have various shapes and sizes, depending on the arrangement and size of pilot body member 100 and a plunger 86 of armature 80. Deformable membrane 90 is made of a durable material and may at least partially be made of an elastic material. Furthermore, the material of deformable membrane 90 is selected to resist possible degradation caused by fluid regulated in pilot body member 100. Therefore, the same valve actuator can be fabricated for various industrial, agricultural applications, while only deformable membrane 90 and pilot body member 100 are specifically designed for the regulated fluid. In medical applications, membrane 90 and pilot member 100 are sterilized or may be made of disposable material. Therefore, the valve actuator may be reused with new disposable elements.

Ferromagnetic armature 80 includes tip portion 86 (i.e., plunger 86) and a spring cavity 82 arranged to receive spring 84, having tapered end portions 84A and 84B. The tapered spring ends enable machine sorting and assembly. Ferromagnetic armature 80 also includes a passage 85 enabling fluid communication between cavity 82 and a chamber 89 sealed by O-ring seal 46 and membrane 90. This again creates a fluid-tight seal for the armature liquid, wherein membrane 90 protects armature 80 from exposure to external fluid located in contact with pilot body member 100. As mentioned above, the armature liquid preferably has a very low viscosity and is non-compressible and non-corrosive. Furthermore, bobbin 14, pole piece 25, armature 80 and passage 85 enable a relatively unobstructed flow of the sealed armature fluid as the actuator moves, i.e., there is a low-resistance path for the armature fluid.

The actuator assembly includes pilot body member 100 reproducibly secured to the operator assembly, which provides numerous advantages. Specifically, pilot body member 100 includes external threads 101, which engage complementary threads 74 in pole piece 70, and a flange 102. Flange 102 butts against a shoulder portion 76 of pole piece 70 providing a positive stop to the pilot body member's being screwed onto the operator assembly. This positive stop provides a known, substantially constant distance and geometry between an external surface of resilient portion 96 and a valve seat 104. The known, substantially constant distance and geometry in turn assures reproducible closing and opening action of the valve member.

In general, during field maintenance or replacement, the valve actuator or other elements may be removed or replaced, which in turn may cause a change in the distance and geometry between valve seat 104 and element 96 of the valve actuator. Furthermore, various piece-part tolerances and O-ring deformability may result in some variability in the position of the pilot body's central tube 106 with respect to resilient member 96. This variability can cause resultant variability in the valve operation or during the open and close times. On the other hand, the pilot-valve and seat spacing and geometry is set when pilot member 100 is pre-assembled onto the valve operator, as shown in FIGS. 2 and 3.

In the closed position, resilient portion 96 seals the opening at valve seat 104, and thus prevents fluid flow from a pilot passage 105 to a pilot passage 106. Pilot body member 100 may be coupled to a diaphragm via pilot passages 105 and 106. Thus, the use of pilot body member 100 is a novel improvement of the operation of diaphragm-controlled flush valves, for example, disclosed in U.S. Pat. Nos. 5,125,621; 5,195,720; 5,196,118; and 5,244,179, which are incorporated by reference. Furthermore, several diaphragms may be cascaded together, wherein passages 105 and 106 are connected to a first, smaller diaphragm, which in turns controls a second larger diaphragm that enables flow of a large amount of fluid pass the diaphragm in its open state. These two diaphragms linked together create an amplification effect for effectively controlling fluid flow by a diaphragm.

Figure 3:
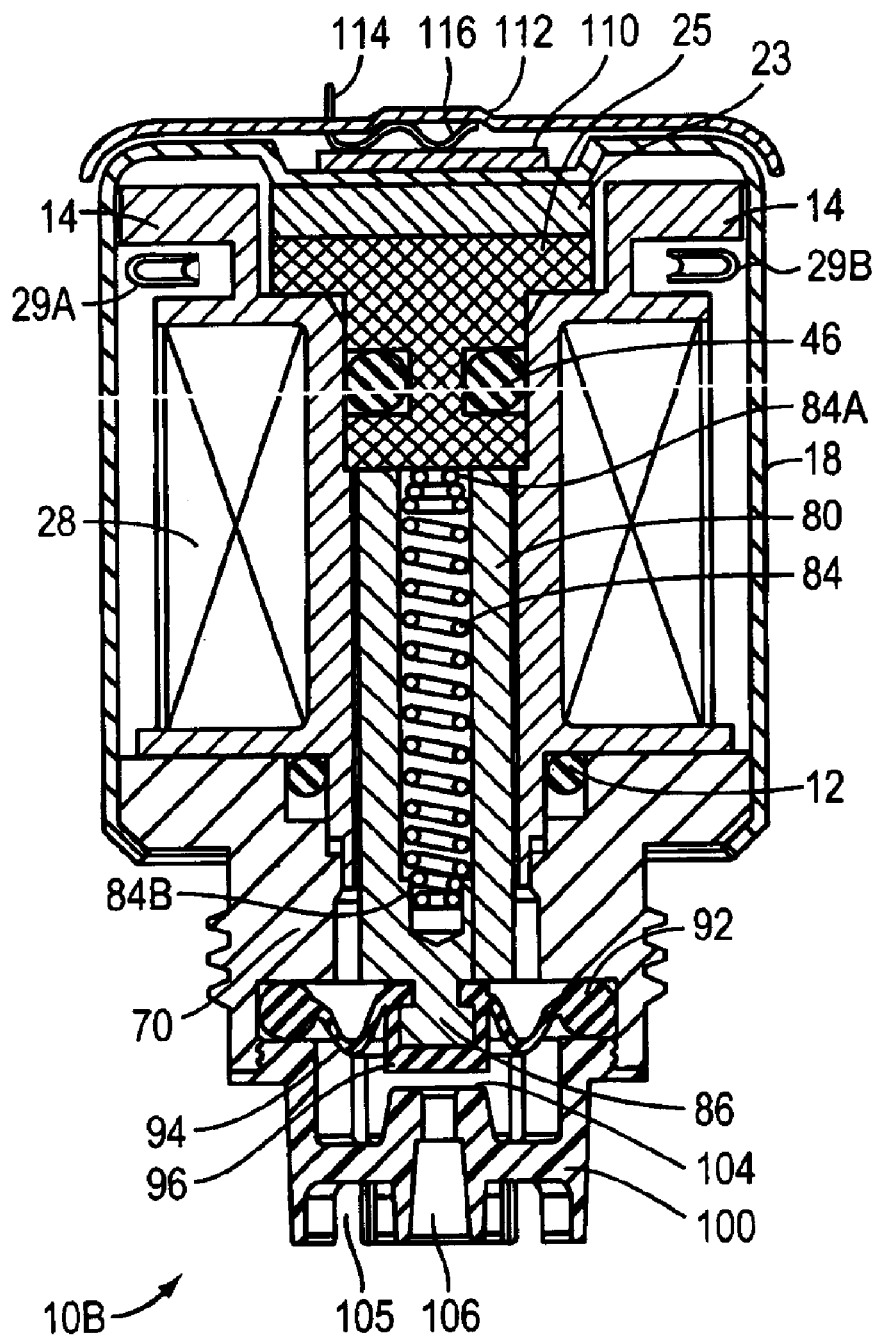
FIG. 3 is a cross-sectional view of the operator shown in FIG. 2 including a piezoelectric transducer.

FIG. 3 illustrates another embodiment of the valve actuator. Valve actuator 10B includes coil 28 wound on bobbin 14, and actuator base 70 mounted inside an actuator housing 18. The latching version of valve actuator 10B includes latching magnet 23, ferromagnetic pole piece 25, and a ferromagnetic armature 80 slideably mounted in an armature pocket formed in pole piece 25. Resiliently deformable O-ring 12 forms a seal between solenoid bobbin 14 and actuator base 70, and O-ring 46 forms a seal between pole piece 24 and solenoid bobbin 14. Bobbin 14 forms recess 20 shaped for a distal end of pole piece 25 and disk-shaped magnet 23. Valve actuator 10B also includes a position sensor such as a piezoelectric transducer 110 located within sensor housing 112. The non-latching version of valve actuator 10B does not include latching magnet 23, but may optionally include the position sensor in the place of magnet 23. As described above, these actuator elements are crimped inside solenoid housing 18.

Referring still to FIG. 3, valve actuator 10B also includes resiliently deformable membrane 90 located between actuator base 70 and pilot body member 100. As described above, actuator base 70 includes a wide base body in contact with bobbing 14, and a narrowed base extension. The narrowed base extension of actuator base 70 includes external threads 72 and internal threads 74. Pilot body member 100 includes external threads 101, which engage complementary internal threads 74, and flange 102. (Alternatively, actuator base 70 and pilot body member 100 may be connected by other types of locking mechanisms.) Flange 102 butts against a shoulder portion 76 of pole piece 70 providing a positive stop to the pilot body member's being screwed onto the operator assembly. This positive stop again provides a known, substantially constant distance and geometry between an external surface of resilient portion 96 and a valve seat 104.

As described above, resiliently deformable membrane 90 includes outer ring 92, compliant region 94, and resilient, C-shaped region 96. There are various possible shapes and sizes of deformable membrane 90 and region 96, depending on the arrangement and size of pilot body member 100 and plunger 86.

Ferromagnetic armature 80 includes plunger 86 and a spring cavity 82 arranged to receive spring 84, having tapered end portions 84A and 84B. The tapered spring ends enable machine sorting and assembly. Plunger 86 may have a circular, elliptical, rectangular or another cross-section. Ferromagnetic armature 80 also includes a passage 85 (shown in FIG. 2A) enabling fluid communication between cavity 82 and a chamber 89 sealed by O-ring seal 46 and membrane 90. This again creates a fluid-tight seal for the armature liquid, wherein membrane 90 protects armature 80 and plunger 86 from exposure to external fluid located in contact with pilot body member 100. That is, the entire armature 80 surrounded by the armature liquid that has substantially equilibrated pressure being applied to the armature surface (i.e., armature 80 substantially "floats" in the armature liquid). As mentioned above, the armature liquid preferably has a very low viscosity and is non-compressible and non-corrosive. Furthermore, bobbin 14, pole pieces 25 and 70, armature 80 and passage 85 enable a relatively unobstructed flow of the armature fluid as the actuator moves, i.e., there is a low-resistance path for the armature fluid.

Advantageously, the actuator assembly includes pilot body member 100 reproducibly secured to the operator assembly, as described above. Flange 102 butts against a shoulder portion 76 of pole piece 70 providing a positive stop that provides a known, substantially constant distance and geometry between an external surface of resilient portion 96 and a valve seat 104. The known, substantially constant distance and geometry in turn assures reproducible closing and opening action of the valve member. Furthermore, pilot body member 100 may be shaped to receive a diaphragm.

Figure 4:
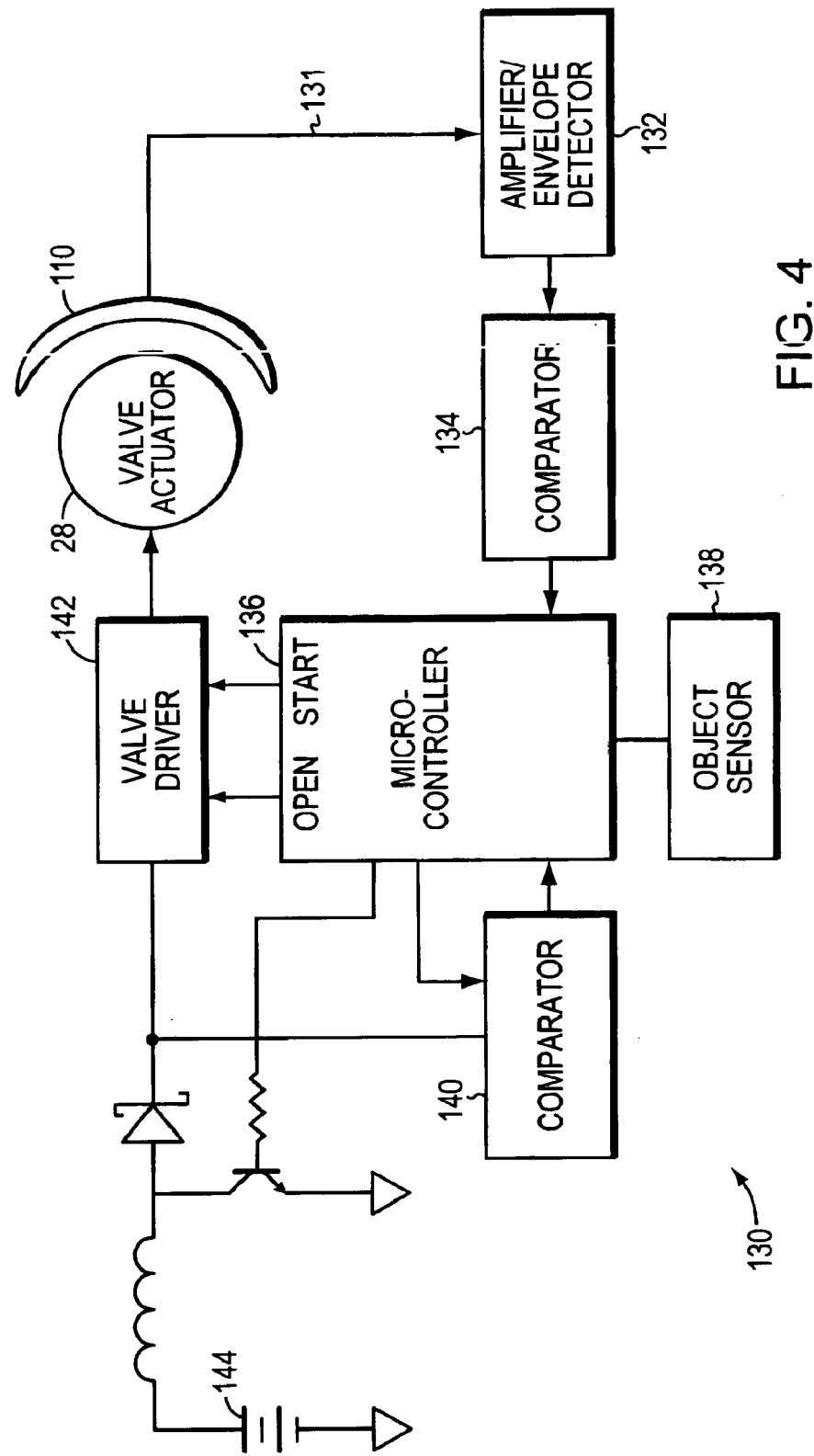
FIG. 4 is a block diagram of a control system for the actuator.

FIG. 4 is a partially schematic and partially diagrammatic illustration of a control circuit used for valve actuator 10C. Control circuit 130 includes a sensor amplifier and envelope detector 132, a comparator 134, a microcontroller 136 receiving signal from an object sensor 138, a comparator 140 and a valve driver 142. To close the valve, valve driver 142 applies a drive voltage, e.g., through terminals 29A and 29B, to pass a drive current through coil 28, as described in U.S. Pat. Nos. 6,293,516 and 6,305,662, both of which are incorporated by reference.

In general, the valve actuator may use different types of control circuits such as the circuits described in U.S. Pat. Nos. 5,781,399; 5,803,711; 5,815,365; or 6,021,038. The drive current induces the corresponding magnetic flush guided largely by ferromagnetic housing 18, rear pole piece 25, and front pole piece 70. In the latching embodiment, the drive voltage's polarity is such that the resultant magnetic flux opposes that of the permanent magnet 23. This breaks the magnet 23's hold on armature 80 and allows return spring 84 to urge plunger 86 together with membrane portion 96 onto valve seat 104. Once the valve has thus closed, the return spring keeps it closed without any further assistance from coil 28. In the closed state, the magnetic force by magnet 23 on armature 22 is less than that of return spring 84 due to the armature 22's increased distance from magnet 23.

To open the valve, valve driver 142 applies drive voltage in the opposite direction so the resultant magnetic flux has the same orientation as the flux from magnet 23. Thus, the applied magnetic flux reinforces that of the permanent magnet 18 and overcomes the force of return spring 84. Therefore, armature 80 moves toward magnet 23, and in the retracted position of plunger 86, the permanent magnet 23's force is great enough to hold armature 80 against the return spring 84's force without applying any "hold" drive current. On the other hand, in the non-latching embodiment, the "hold" drive current must be applied since there is no permanent magnet 23.

Because of the latching valve's bistable nature, control circuits that operate it typically discontinue current flow after the valve has reached the desired state. Since the time required for the valve to reach the desired state can vary widely, conventional control circuits make the current-flow duration relatively long so that it will be adequate for worst-case conditions. Since most actuations are not performed under worst-case circumstances, though, coil drive typically continues for some time after the valve reaches its stable position. This is a waste of battery energy. To reduce this waste, control circuit 130 can monitor the armature to determine whether the armature has reached its endpoint, and it stops applying coil drive just before or when that occurs.

In general, to monitor the position of plunger 86, valve actuator 10B includes a position sensor that may be a piezoelectric transducer, a capacitive transducer, an inductive transducer, an optical transducer, or any other transducer directly or indirectly coupled to armature 80. For example, piezoelectric transducer 110 monitors location of armature 80 by taking advantage of the sound that armature 80 makes when it reaches either end of its travel. We use the term sound here in the broad sense of a pressure or strain wave. In most embodiments, moreover, the predominant frequency components of the "sound" are typically above the audible range.

In the illustrated embodiment of FIG. 3, the armature sensor is piezoelectric transducer 110 that responds to vibrations in the housing wall. The piezoelectric element 110's size and shape have typically been so chosen as to maximize its response to the predominant frequency components, and it normally is mounted in a location where the sounds to be detected are greatest in amplitude or most distinguishable from noise. Alternatively, the armature sensor is a capacitive sensor that includes one plate located on a stationary actuator surface and the other plate located on a surface of moving armature 80. The movement of armature 80 causes relative displacement of the two capacitor plates, which in turn changes the measured capacitance value. Based on the capacitance value, the capacitive sensor determines the end position or any instantaneous position of armature 80 (and thus the position of plunger 86).

Alternatively, the armature sensor is an optical sensor that includes an optical source and an optical detector. The source emits optical radiation that is reflected from (or possibly transmitted through) a surface of the armature and detected by the detector. The reflection surface modifies the emitted optical signal. Thus, the detected signal varies depending on the position of the armature (i.e., instantaneous location of plunger 86). Based on the detected optical signal, the optical sensor determines the end position or any instantaneous position of armature 80. Alternatively, the armature sensor uses a source of electromagnetic radiation and a corresponding detector. The detector measures perturbation of the generated electromagnetic radiation by the armature depending on the location of the armature. Based on the detected perturbed radiation, the sensor determines the end position or any instantaneous position of the armature.

Referring again to FIG. 3, a terminal 114 provides electrical communication to one of the transducer 110's electrodes through a contact spring 116 secured in place for example by a plastic cap 112. The other electrode of transducer 110 may be shared with coil 28, e.g., if the transducer is secured to the housing 18 by conductive bonding between the housing and that electrode.

Referring to FIG. 4, piezoelectric sensor 110 provides a sensor signal 131 to amplifier and envelope detector 132, which includes an amplifier tuned to the expected sound's predominant (typically ultrasonic-range) frequency components. Amplifier and envelope detector 132 rectifies the resultant filtered signal, and low-pass filters the result to produce an output representative of the tuned-amplifier output's envelope. When armature 80 reaches an endpoint and causes housing vibration, the resultant envelope value exceeds a threshold that a comparator 134 applies. Since in the illustrative embodiment the sonic amplitude is higher when the valve opens than when it closes, a microcontroller 136 sets a comparator threshold whose value when the valve is being opened is different from the value it has when the valve is being closed.

Microcontroller 136 may operate the valve actuator in response to a trigger signal from an object sensor 138. Control circuit 130 can be constructed to operate with different types of object sensors that detect presence or motion. For example, object sensor 138 may be an ultrasonic sensor, a capacitive sensor, or an optical sensor such as any one of the sensors described in U.S. Pat. Nos. 5,984,262; 6,127,671; or 6,212,697, all of which are incorporated by reference.

According to one embodiment, object sensor 138 is an optical sensor described in U.S. Pat. No. 6,212,697. The optical sensor includes a light source and a light detector. The light source (e.g., an infrared LED) is disposed behind a lens having a generally circular portion of its optically useful part. The source lens forms rear surface that is spherically convex, having a 0.63-inch radius of curvature and a peripheral edge that defines a plane normal to a line that extends downward to the right at an angle of 18.6 degrees with the horizontal. The lens's front, exit surface is also spherically convex, having a 2.0-inch radius of curvature and a peripheral edge that defines a plane normal to a line that extends downward to the left at an angle of 9.8 degrees with the horizontal. The source is positioned to provide a radiation pattern described and shown in U.S. Pat. No. 6,212,697. The radiation detector (e.g., a photodiode) is located behind a receiver lens having shapes of left and right faces the same as those of the transmitter lens' corresponding surfaces. The receiver lens surfaces collect light received from a target (e.g., a person in front of a urinal) and tend to direct it toward the radiation detector. This arrangement is responsible a receiver pattern also described and shown in U.S. Pat. No. 6,212,697.

For example, upon receiving a trigger signal from object sensor 138, microcontroller 136 may provide an "open" signal to valve driver 142, when the sensor detects user's leaving the flusher's vicinity. Furthermore, microcontroller 136 may provide a "close" signal after the valve has been open for a predetermined duration. To open the valve, the microcontroller sets an OPEN signal applied to a valve-driver circuit 142. This causes that circuit to drive current through the actuator 28's coil in the direction that will cause the valve to open.

When that current starts flowing, comparator 134's output initially indicates that amplifier 132's output is less than the threshold, so the amplifier is not receiving sound of a magnitude consistent with the armature's reaching the end of its travel. The microcontroller 136 therefore keeps the OPEN signal asserted. But comparator 134's output changes in response to the sound made by the armature 80 at the end of its travel. When armature 80 has reached that point, the valve will stay open without current flow, so the microcontroller de-asserts its OPEN output and thereby causes the valve driver 142 to stop applying drive current to actuator coil 28. The result usually is that the current-flow duration has been much less than the time required to open the valve under worst-case conditions, so the system has saved considerable energy.

To close the valve, the microcontroller 136 asserts its CLOSE output and thereby causes the valve driver 142 to apply the drive signal to actuator coil 28 in the opposite direction. Again, the microcontroller allows current flow only until comparator 134 informs it that the armature has reached the end of its travel.

Control circuit 130 can be used to control not only the drive signal's duration but also its magnitude. The drive signal duration may be in the range of less than about 1 msec to about 10 msec, and preferably in the range of 1.5 msec to 8 msec. A coil-drive level high enough for ordinary operation may occasionally be inadequate, and the coil-drive level can be increased if the armature fails to reach the endpoint. One way to increase the coil-drive level is to increase the voltage on capacitors discharged through the actuator coil.

FIG. 4 depicts the valve driver 142 as being powered by a battery 144. The valve driver 140 typically includes energy-storage capacitors, which the battery 144 charges up between actuations through an inductor L1 and a Shottky diode D1. When the microcontroller 136 asserts its OPEN or CLOSE signal, the driver discharges the capacitors through actuator coil 28. Ordinarily, it is the voltage of battery 144 itself that determines the voltages to which the capacitors will be charged, and this in turns determines coil current and thus armature force.

Under some conditions, various factors (e.g., element expansion due to high temperature, high actuator fluid viscosity due to low temperature, degradation of membrane 90 or other actuator elements) may make it harder than usual to displace armature 80. However, the drive signal is normally set at normal operation values. Otherwise, energy consumption would be unnecessarily high if, during normal operation, the battery voltage were set high enough to deal with such more-difficult circumstances. The present embodiment therefore uses a battery-voltage level that is adequate for normal situations, but not for more-difficult ones.

Control circuit 130 is constructed to increases the capacitor voltage if the armature has not moved after initial application of drive signal, or has not reached the end of its travel within predetermined maximum current-flow duration. Specifically, microcontroller 136 turns the valve driver off temporarily when the predetermined maximum current-flow duration is reached, and it begins to pulse a transistor Q1 through a current-limiting resistor R1. During each pulse, the transistor draws current from the battery through inductor L1. Because of diode D1, though, it does not discharge the valve driver's capacitors. At the end of each pulse, transistor Q1 turns off, and the resultant electromotive force in inductor L1 causes current to continue to flow and thereby charge the drive circuit's capacitors through diode D2 even if those batteries' voltage exceeds that of the battery 144. So those capacitors can be charged to voltages that exceed the battery's.

To achieve the appropriate capacitor voltage, a comparator 140 compares the capacitor voltage to a level that microcontroller 136 sets. In response to the comparator's resultant output, microcontroller 136 increases the pulses' duty cycle if the capacitor voltage is less than the threshold, and it decreases their duty cycle if the capacitor voltage exceeds the threshold. The threshold is set higher than the battery voltage, so the force on the armature is greater and more likely to open or close the valve when the microcontroller then turns the valve driver on again.

The illustrative embodiment is only one of many that can employ the present invention's teachings. For example, although we prefer to use a sonic sensor—in particular, an ultrasonic transducer-other ways of detecting the end of armature travel can be used instead. Also, although the illustrated embodiment controls coil-drive duration both when the valve is being opened and when it is being closed, some embodiments may control that duration only during opening or only during closing. And latching-actuator systems that operate mechanisms other than valves can also benefit from the present invention's teachings.

Moreover, although we have employed a simple amplitude criterion to determine whether the armature has reached the end of its travel, other criteria may be found preferable for some applications. For instance, the sonic signal could be sampled and compared by signal processing with a stored waveform known to be characteristic of the armature's reaching one of its endpoints. The stored signal may be different for different endpoints, and there may be circumstances in which it will be considered valuable to use such a comparison to distinguish between the actuator's two states.

Any of the above-described valve actuators is suitable for numerous applications. For example, the described valve actuator can be used in a two-fluid valve described in U.S. application Ser. No. 718,026 filed on Nov. 20, 2000, which is hereby incorporated by reference. Alternatively, the valve actuator can be used in a fluid dispensing system described in U.S. Pat. No. 6,161,726 or PCT Application PCT/US99/30898 (published as WO 00/38661), both of which are incorporated by reference. Furthermore, the valve actuator can be used in various irrigation system used in agriculture or gardening.

Having described various embodiments and implementations of the present invention, it should be apparent to those skilled in the relevant art that the foregoing is illustrative only and not limiting, having been presented by way of example only. There are other embodiments or elements suitable for the above-described embodiments, described in the above-listed publications, all of which are incorporated by reference as if fully reproduced herein. The functions of any one element may be carried out in various ways in alternative embodiments. Also, the functions of several elements may, in alternative embodiments, be carried out by fewer, or a single, element.

What is claimed is:

1. An electromagnetic actuator, comprising:
   a solenoid coil and an armature housing constructed and arranged to receive a ferromagnetic armature including a distal part,
   a membrane secured with respect to said armature housing and arranged to enclose at least partially said distal part to seal armature fluid within an armature pocket providing a volume for said armature fluid, wherein displacement of said distal part displaces said membrane with respect to a valve passage controlled by said actuator,
   an actuator base arranged with a pilot body member and said membrane to provide a valve comprising said valve passage, said valve including a valve seat arranged for contact with said membrane, and
   an armature port providing a fluid passage to enable flow of said armature fluid between said distal part and a proximal part of said armature thereby enabling rapid linear movement of said armature with respect to said armature housing during opening and closing of said valve passage, wherein said armature fluid is enclosed within said volume during said movement.

2. The actuator of claim 1 wherein said pilot body member is attached to said actuator base to provide a known, substantially constant distance between an external surface of said membrane and said valve seat.

3. The actuator of claim 1 wherein said body member includes a shoulder cooperatively designed with respect to said actuator base to provide a reproducible stop and thereby achieve a known, substantially constant distance when attaching said pilot body member to said actuator base.

4. The actuator of claim 1 wherein said membrane includes a compliant region, and a resilient region designed to be displaced by said distal part of said armature and designed to come in contact with said valve seat.

5. The actuator of claim 4 wherein said resilient region is further designed to be attached to said distal part of said armature.

6. The actuator of claim 5 wherein said resilient region includes a C-shaped member designed for said attachment to said distal part.

7. The actuator of claim 1 constructed for controlling water flow.

8. The actuator of claim 7 constructed for controlling water flow in a water flushing system.

9. The actuator of claim 7 constructed for controlling water flow in an irrigation system.

10. The actuator of claim 1, wherein said solenoid coil is coupled to a control circuit constructed and arranged to apply a coil drive for actuating said linear movement of said armature.

11. The actuator system of claim 10 further including a presence sensor constructed and arranged to provide electrical signals to said control circuit.

12. The actuator system of claim 10 further including a motion sensor constructed and arranged to provide electrical signals to said control circuit.

13. An electromagnetic actuator, comprising:
   a solenoid coil and an armature housing constructed and arranged to receive a ferromagnetic armature including a distal part,
   a membrane secured with respect to said armature housing and arranged to enclose at least partially said distal part to seal armature fluid within an armature pocket providing a volume for said armature fluid, wherein displacement of said distal part displaces said membrane with respect to a valve passage controlled by said actuator, and
   an armature port providing a fluid passage to enable flow of said armature fluid between said distal part and a proximal part of said armature thereby enabling rapid linear movement of said armature with respect to said armature housing during opening and closing of said valve passage, wherein said armature fluid is enclosed within said volume during said movement,
   wherein said distal part of the armature is arranged to compress said membrane against a valve seat when said armature is disposed in its extended armature position, and
   wherein a ratio that the area of said distal part bears to the area of said membrane exposed to a conduit upstream of the membrane is between 1.4 and 12.3.

14. The actuator of claim 13, wherein said solenoid coil is coupled to a control circuit constructed and arranged to apply a coil drive for actuating said linear movement of said armature.

15. The actuator system of claim 14 further including a motion sensor.

16. The actuator system of claim 14 further including a presence sensor.

17. The actuator of claim 13 wherein said membrane includes a compliant region, and a resilient region designed to be displaced by said distal part of said armature and designed to come in contact with said valve seat.

18. The actuator of claim 17 wherein said resilient region is further designed to be attached to said distal part of said armature.

19. The actuator of claim 18 wherein said resilient region includes a C-shaped member designed for said attachment to said distal part.

20. The actuator of claim 13 constructed for controlling water flow.

21. The actuator of claim 20 constructed for controlling water flow in a water flushing system.

22. The actuator of claim 20 constructed for controlling water flow in an irrigation system.

23. The actuator of claim 13 further including a permanent magnet arranged to form a latching actuator.

24. The actuator of claim 23 further including a bias spring positioned and arranged to bias said armature toward its extended position.

25. The actuator of claim 24 wherein said fluid passage is located within said ferromagnetic armature and is constructed to receive said bias spring.

26. The actuator of claim 13 wherein said armature fluid includes incompressible fluid comprising a corrosion inhibitor.

27. The actuator of claim 13 wherein said armature fluid includes an incompressible fluid having a large molecule.

28. A method of operating an actuator, comprising the steps of providing a solenoid coil and an armature housing constructed and arranged to receive an armature including a distal part, providing a membrane secured with respect to said armature housing and arranged to enclose at least partially said distal part to seal armature fluid within an armature pocket providing a volume, wherein displacement of said distal part displaces said membrane with respect to a valve passage controlled by said actuator, providing an armature port enabling a fluid passage to enable flow of said armature fluid between said distal part and a proximal part of said armature, and delivering a drive signal to said solenoid coil to provide opening and closing of said valve passage by linearly displacing said armature, wherein said armature fluid is enclosed within said volume during said opening and closing, wherein said opening and closing includes traversing a known, substantially constant distance between an external surface of said membrane and a valve seat of said valve passage.

29. The method of claim 28, wherein said opening and closing includes displacing a resilient region of said membrane designed to be attached to said distal part of said armature.

30. The method of claim 28, wherein said opening and closing includes displacing a resilient region of said membrane designed to be attached to said distal part of said armature, wherein said resilient region includes a C-shaped member designed for said attachment to said distal part.

31. A method of operating an actuator, comprising the steps of providing a solenoid coil and an armature housing constructed and arranged to receive an armature including a distal part, providing a membrane secured with respect to said armature housing and arranged to enclose at least partially said distal part to seal armature fluid within an armature pocket providing a volume, wherein displacement of said distal part displaces said membrane with respect to a valve passage controlled by said actuator, providing an armature port enabling a fluid passage to enable flow of said armature fluid between said distal part and a proximal part of said armature, receiving a signal from a motion sensor, and delivering a drive signal to said solenoid coil to provide opening and closing of said valve passage by linearly displacing said armature, wherein said armature fluid is enclosed within said volume during said opening and closing.

32. A method of operating an actuator, comprising the steps of providing a solenoid coil and an armature housing constructed and arranged to receive an armature including a distal part, providing a membrane secured with respect to said armature housing and arranged to enclose at least partially said distal part to seal armature fluid within an armature pocket providing a volume, wherein displacement of said distal part displaces said membrane with respect to a valve passage controlled by said actuator, providing an armature port enabling a fluid passage to enable flow of said armature fluid between said distal part and a proximal part of said armature, receiving a signal from a presence sensor, and delivering a drive signal to said solenoid coil to provide opening and closing of said valve passage by linearly displacing said armature, wherein said armature fluid is enclosed within said volume during said opening and closing.

* * * * *